US012626573B2

(12) United States Patent
Hlushchenko et al.

(10) Patent No.: US 12,626,573 B2
(45) Date of Patent: May 12, 2026

(54) HOUSING FOR A SCATTERED LIGHT DETECTION UNIT OF A SMOKE DETECTION DEVICE

(71) Applicant: AJAX SYSTEMS CYPRUS HOLDINGS LTD, Nicosia (CY)

(72) Inventors: Mykhailo Hlushchenko, Kyiv (UA); Volodymyr Maiorov, Novomyrhorod (UA)

(73) Assignee: AJAX SYSTEMS CYPRUS HOLDINGS LTD, Nicosia (CY)

( * ) Notice: Subject to any disclaimer, the term of this patent is extended or adjusted under 35 U.S.C. 154(b) by 108 days.

(21) Appl. No.: 18/461,010

(22) Filed: Sep. 5, 2023

(65) Prior Publication Data

US 2024/0203226 A1 Jun. 20, 2024

(30) Foreign Application Priority Data

Dec. 19, 2022 (UA) .............................. a 2022 04859

(51) Int. Cl.
*G08B 17/107* (2006.01)

(52) U.S. Cl.
CPC .................................. *G08B 17/107* (2013.01)

(58) Field of Classification Search
CPC .................................................... G08B 17/107
USPC ........................................................... 340/630
See application file for complete search history.

(56) References Cited

U.S. PATENT DOCUMENTS 11,069,224 B1 * 7/2021 Hsieh ................... G08B 29/183
11,127,284 B1 * 9/2021 Barson ................. G08B 17/107
11,715,359 B1 * 8/2023 Schmidt ................. G08B 17/10 340/628
2006/0261967 A1 * 11/2006 Marman .............. G08B 17/103 340/630
2018/0061215 A1 * 3/2018 Vollenweider ....... G08B 17/117
2019/0266868 A1 * 8/2019 Patel .................... G08B 17/107
2020/0160688 A1 * 5/2020 Shimadzu .............. G01N 21/01
2020/0312108 A1 * 10/2020 Gadonniex .......... G08B 17/117
2020/0319154 A1 * 10/2020 Dohi .................. G01N 33/0016
2020/0320844 A1 * 10/2020 Buchholz ............... G08B 21/12
2021/0123863 A1 * 4/2021 Gadonniex .......... G08B 17/107
2021/0233373 A1 * 7/2021 Gadonniex .......... G08B 17/107
2021/0248895 A1 * 8/2021 Lincoln ................ G08B 17/107
(Continued)

FOREIGN PATENT DOCUMENTS

KR 10-1963111 B1 7/2019

*Primary Examiner* — Jack K Wang

(74) *Attorney, Agent, or Firm* — SALIWANCHIK, LLOYD & EISENSCHENK

(57) ABSTRACT

A housing for a scattered light detection unit of a smoke detection device, the housing comprises a base (2) fastened to a mounting plate (1), the base is provided with guiding channels (8) for mounting and directing optical elements, and limiting barriers (9) are attached to the channels (8), the barriers are arranged on an inner end surface (10) of the base (2) and surrounded by an opaque wall (7) that is concentric to a lateral outer wall (6), a casing (3) mounted on the base (2), the casing has a lateral portion (13) that encompasses the base (2) and the mounting plate (1) and a disc portion (15) that is parallel to the base (2), the disc portion is provided with an opening (16) having an edge that is directed towards the base (2) and coaxial to the opaque wall (7), and a cover element (7) that is fastened on the casing (3).

17 Claims, 8 Drawing Sheets

(56) References Cited

U.S. PATENT DOCUMENTS

| | | | | |
|---|---|---|---|---|
| 2021/0256826 | A1* | 8/2021 | Piech .................. | G08B 17/117 |
| 2021/0264758 | A1* | 8/2021 | Castillo-Garza ..... | G08B 17/113 |
| 2021/0295666 | A1* | 9/2021 | Gadonniex .......... | G08B 17/107 |
| 2021/0295667 | A1* | 9/2021 | Zu .......................... | G08B 29/18 |
| 2022/0268681 | A1 | 8/2022 | Eichmann et al. | |

* cited by examiner

HOUSING FOR A SCATTERED LIGHT DETECTION UNIT OF A SMOKE DETECTION DEVICE

CROSS-REFERENCE TO RELATED APPLICATION

This application claims priority to Ukrainian Application No. a 2022 04859, filed Dec. 19, 2022, which is hereby incorporated by reference in its entirety.

FIELD OF THE INVENTION

The invention relates to structural features of a housing for a smoke optical detection device that detects smoke particles within an aerial space, a so-called smoke chamber, which is formed by elements of the housing, by detecting their reflection in a light by means of a light-sensitive element, the reflection is generated by a light-emitting element in a field of intersection of emission beams with a vision field of a light receiver.

PRIOR ART

Today, smoke detection devices which comprise photoelectric smoke sensors which operate according to a light scattering principle are the most common and serve as an effective preventive tool to inhibit a fire. Their important operation parameters, as well as in any other smoke sensor, include a possibility to provide a maximum high level of smoke detection and a low level of false actuations, thereby enabling to increase the operation efficiency significantly. These parameters are achieved by selecting physical characteristics of sensors, mathematical characteristics of their adjustment, as well as, what is essential, by modeling features of elements which together form a structure of the sensor's detection unit.

Main requirements for structures of housings for detection units include formation of a smoke chamber, provision of an opaqueness for this chamber from outside and avoidance of a contact between beams of a light emitter and a vision field of a light receiver. Also, an important task is to provide a cleanliness of an interior of the housing by avoiding penetration of external contaminants such as dust, ash residues, insects etc., which could otherwise distort the detection results or lead to a general failure of the device.

A prior art teaches a plurality of solutions for modeling housings for a detection unit of photoelectric sensors of a smoke detection device, in particular, the one disclosed in the application US2022268681A1 dated Aug. 25, 2022, which discloses a housing for a detection unit, the housing comprises a cylindrical outer surface having openings through which smoke particles enter the housing and a radially symmetric light-guiding structure having guiding members which form a smoke chamber and are so designed that adjacent guiding members each form a guiding channel through which an emission emitted by a light source and not scattered by the smoke particles is guided to outside towards the smoke openings by multiple reflection. Therewith, the housing comprises a base with a light source and a light receiver mounted thereon in holders, and the light source and the light receiver are directed such that a path of the emission beam emitted by the light source and a vision field of the light receiver, where the scattered emission is detected, form an intersection area that is located outside a plane in which the light source and the light detector are arranged. An additional barrier that avoids the light from entering the vision field of the light receiver is a light reflecting cone that is provided on an inner end surface of a cover element of the housing. A drawback of said housing is that said guiding elements perform both light protecting and filtering functions, while in order to perform these functions effectively, the guiding elements should be profiled with such a mathematical precision that is not achievable under mass production conditions, thus, an achievement of both maximum filtration and opaqueness is doubtful. Furthermore, according to the structure, a main location for detecting the scattered light is located closer to a bottom of the chamber which is caused by the fact that the holders of the light sources and the light receiver are arranged almost right next to each other, which, in turn, may cause false actuations, since areas which contribute to dust sedimentation are formed both at the bottom of the chamber and on the holders, thereby increasing a probability of false actuations.

Also, the prior art teaches a patent KR101963111B1 dated Jul. 31, 2019 which discloses a photoelectric smoke detection device comprising a scattered light sensor that is provided in a housing that consists of a base fastened to a mounting plate that is attached to a control board for controlling a power unit, and the base is provided with holders for mounting and directing optical elements which are arranged in a space that is limited by an opaque wall that is concentric to a lateral outer wall. A casing is mounted on the base, the casing has a lateral portion encompassing the base and a disc portion that is parallel to the base, the disc portion is provided with an opening having an edge that is directed towards the base and is coaxial with the opaque wall. The casing is closed from a top with a cover element formed as an opaque film that covers the opening tightly. Therefore, the coaxial arrangement of the base, the casing and the cover element forms a smoke chamber in which smoke particles are detected. Therewith, the smoke comprised in a gas-air mixture comes into the smoke chamber through openings provided in the lateral outer wall of the base which also perform a filtration function, and the smoke, while bypassing an edge of the opaque wall, comes into its interior, and a site of intersection between the emission beams with the vision field of the light receiver is located in a place, where the edge of the casing opening comes within boundaries of the opaque wall of the base. In order to further block a direct optical path of the optical elements towards each other, the housing is provided with a blocking film that is mounted between their holders on the inner end portion of the base, and the smoke chamber itself in a part of the opening has light scattering elements formed as vertical ribs.

A drawback of said housing is an insufficient concentration of the smoke at the site for its detection, since when the smoke incomes by its natural flow, the smoke is dispersed across the entire chamber, moreover, a short passage path of the smoke into the chamber through the openings provided in the lateral wall of the base is not sufficient to provide a thorough sedimentation of foreign dust impurities on the filtration openings, thus, the dust settles inside, in particular, on the optical elements, thereby affecting its correct operation. Besides, the detection zone in this structure is located rather close to the installation site of the optical elements, thereby requiring additional and ineffective obstacles for direct optical paths.

SUMMARY OF THE INVENTION

A task of the claimed invention is to provide a structure of a housing for a detection unit which could enable an improved homogeneous passage of a smoke cleaned from other impurities as much as possible into a smoke chamber, its guiding to a detection zone as precisely as possible and its additional concentrating in the zone, as well as creation of obstacles for a possible dust sedimentation on walls of the smoke chamber and on optical elements. The posed task is resolved by a housing for a scattered light detection unit of a smoke detection device, the housing comprises a base fastened to a mounting plate, the base is provided with guiding channels for mounting and directing optical elements, which have limiting barriers that protrude on an inner end surface of the base, the barriers are surrounded by an opaque wall along the inner end surface of the base, the opaque wall is concentric to a lateral outer wall. A casing is mounted on the base, the casing has a lateral portion that encompasses the base and a disc portion that is parallel to the base, the disc portion is provided with an opening having an edge that is directed towards the base and is coaxial with the opaque wall of the base, and a cover element is fastened on top of the casing. According to the invention, the casing is fixable on the base, while forming a tight fit of the edge of the opening to the edge of the opaque wall of the base. The edge of the casing opening is directed towards the base owing to a curved tilted area that is formed between an annular protrusion that is provided on an outer surface of the disc portion and the edge of the opening. Therewith, the limiting barriers are made perpendicular to the end surface of the base and arranged opposite to each other, while forming a gap between them, and their height is not more than a height of the opaque wall. Such a configuration creates a first part of the smoke chamber, in which a tight protection against light coming from outside is provided, an intersection between light beams from emitters and a vision field of the light receiver is avoided, and a space that is limited by the inner end surface of the base is provided for a possible dust sedimentation/adherence outside the optical elements.

According to the proposed solution, the cover element consists of a central portion that is closed from one end and faced towards the casing by its open end, a peripheral lattice portion having series of concentrically arranged longitudinal slit-like openings, and a lateral portion that is fixable on the lateral portion of the casing. A diameter of the open end of the central portion is the same as a diameter of the casing opening; the peripheral portion of the cover element is divided into sectors by radial equidistant partitions, and the lateral portion of the cover element is fixable on the lateral portion of the casing, thereby providing an annular slit formed between the open end of the central portion of the cover element and the curved tilted area of the disc portion of the casing, as well as a tight fit of lower portions of the radial partitions of the peripheral portion to the disc portion of the casing. Such a configuration of the cover portion forms a second part of the smoke chamber that is provided with labyrinthine passage paths and a proper filtration of an air-gas mixture through the openings in the lattice portion and its passage along the sectoral channels to a slit area and, thus, into the smoke chamber. Therewith, an inner end surface of the central portion of the cover element has a curved shape, while forming a smooth transition to a cone-like protrusion from its edge to center, and a height of the cone-like protrusion is not more than a length of the central portion, thereby promoting the smoke to concentrate in the center of the second part of the smoke chamber, especially, in the slit area to which the optical elements are directed and which defines “an optical center”, i.e., a site of intersection between the emission beams and the vision field of the light receiver.

Also, according to possible embodiments, the inner portion of the base, the disc outer surface of the casing and the outer surface of the cover element are made glossy (polished), and the inner surface of the central portion of the cover element, the curved tilted area and the edge of the casing opening have a SPI-SPE-D1 grade texturing. Such a configuration promotes the air-gas mixture to pass into the smoke chamber along the glossy surfaces tangent to its passage, and the texturing of said areas promotes an absorption of residuals of a direct emission and holding the smoke inside an air space of the second part of the smoke chamber and in the detection zone.

According to one of exemplary embodiments, the surface of the opening edge of the casing and the inner surface of the central portion of the cover element may be equipped with light-scattering elements formed as coaxial vertical ribs which further promote re-scattering and blocking of the direct emission inside the smoke chamber, since a photoreceiver, in a normal state, should not receive a signal from emitters.

According to a further exemplary embodiment, a number of the radial partitions of the peripheral portion of the cover element is from 6 to 8, and a ratio between an area of the openings to an overall area of the peripheral portion of the cover element is within 30-40%. It has been experimentally established that said parameters are sufficient and necessary to provide a homogeneous passage and guidance of the air-gas flow into the smoke chamber.

Therefore, the claimed solution enables to create the housing for the scattered light detection unit having a two-leveled chamber, where the optimal smoke detection zone is formed in an inter-layer space of the chamber, and paths for incoming and concentration of the gas-air mixture are provided in the smoke detection zone.

The set of essential features of the present solution allows to achieve a technical effect that lies in increase of an opaqueness of the smoke chamber from outside, increase of blocking a contact between direct beams of the light emitter and the vision field of the light receiver from inside, provision of cleanliness of both optical elements and the inner space within the scattered light detection zone. Such a configuration of the housing for the detection unit affects a correct operation of the smoke detection device by increasing its precision and reducing false actuations.

BRIEF DESCRIPTION OF THE DRAWINGS

In order to provide more complete understanding of the claimed invention and advantages thereof, the following description provides an explanation of possible exemplary embodiments thereof with a reference to figures of the appended drawings, wherein identical designations denote identical parts, and which illustrate the following:

Figure 1:
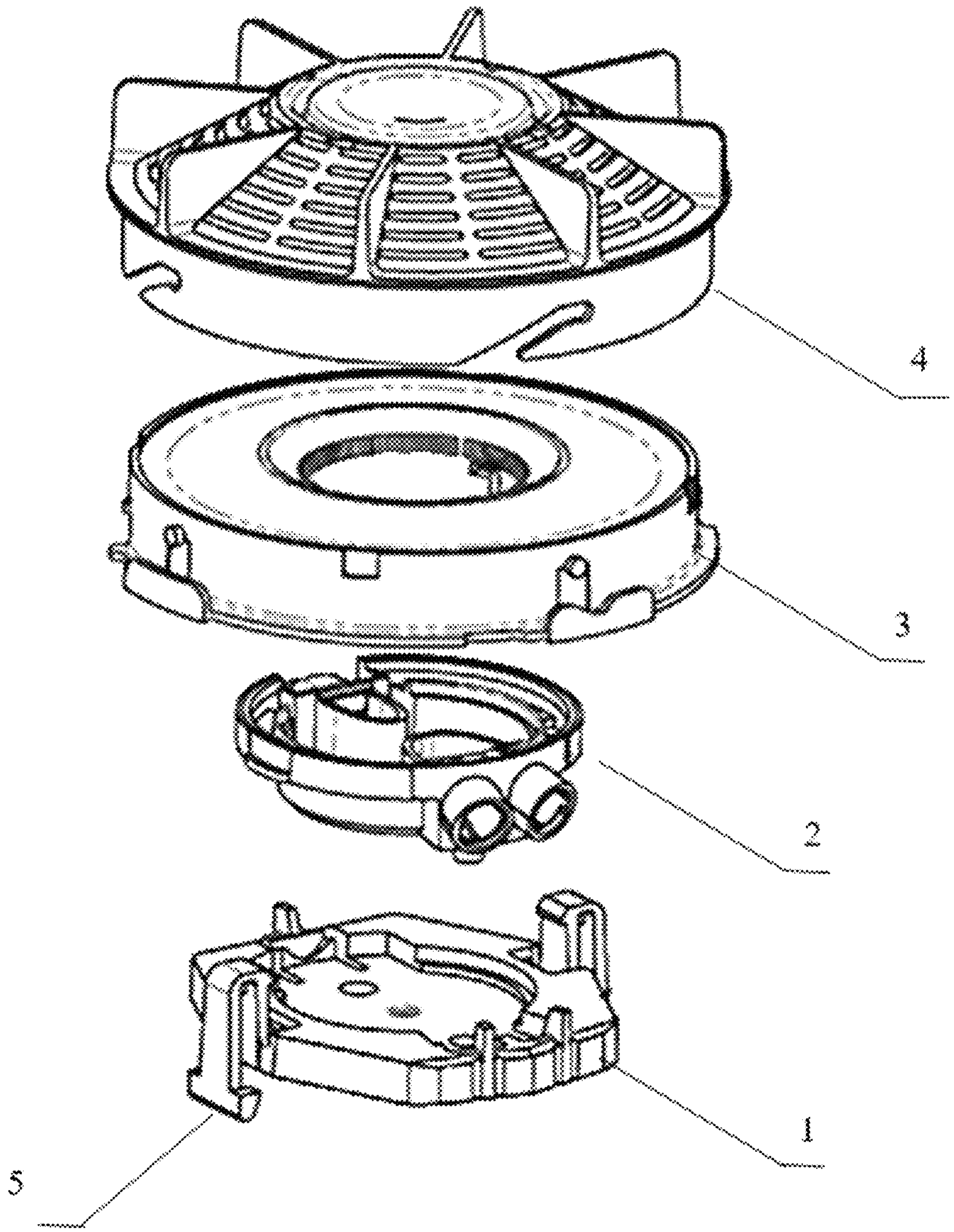
FIG. 1 shows an exploded view of elements of the housing for the scattered light detection unit of the smoke detection device.
Figure 2:
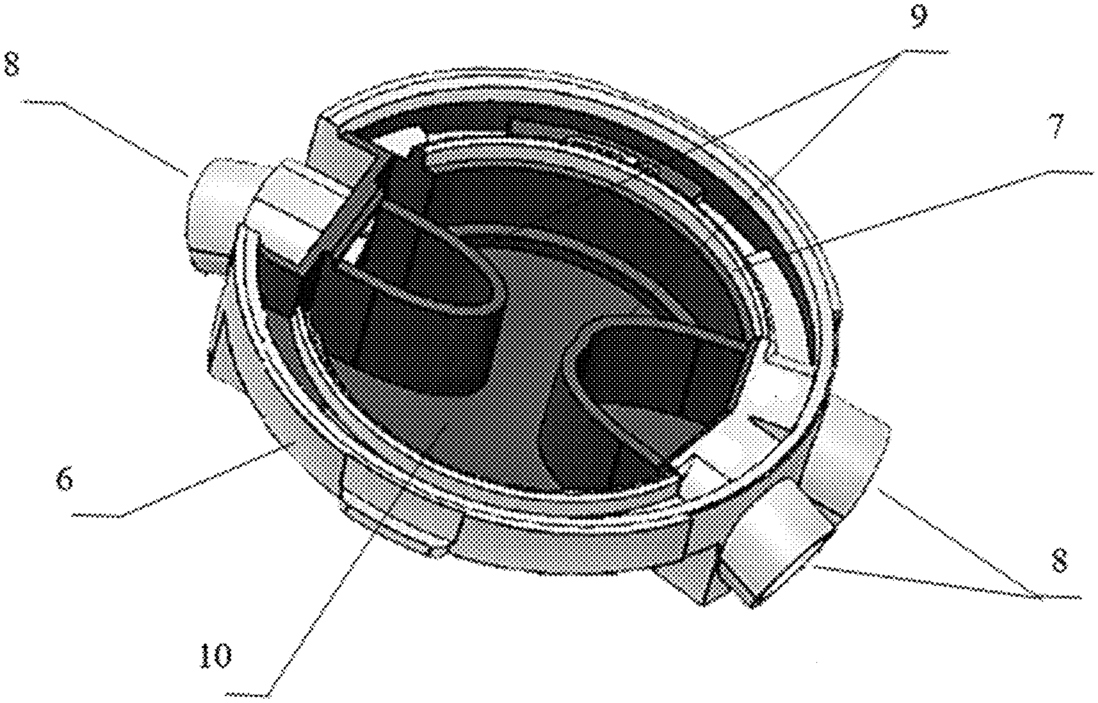
FIG. 2 shows a perspective view of the housing base.
Figure 3:
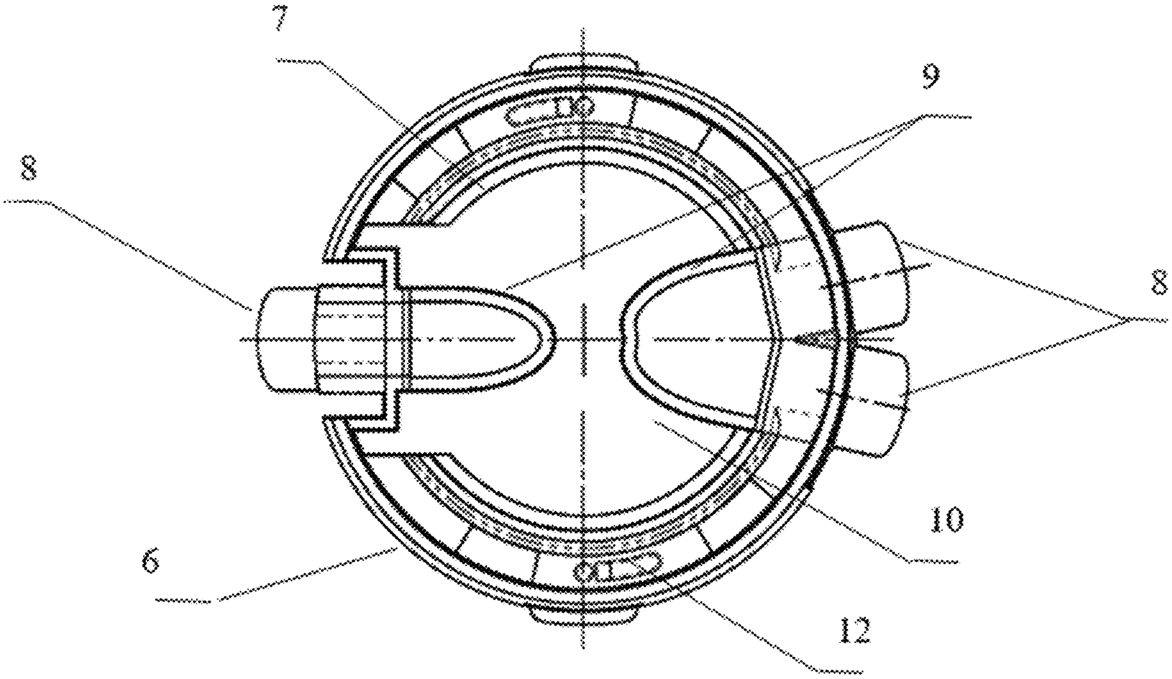
FIG. 3 shows a top view of the housing base.
Figure 4:
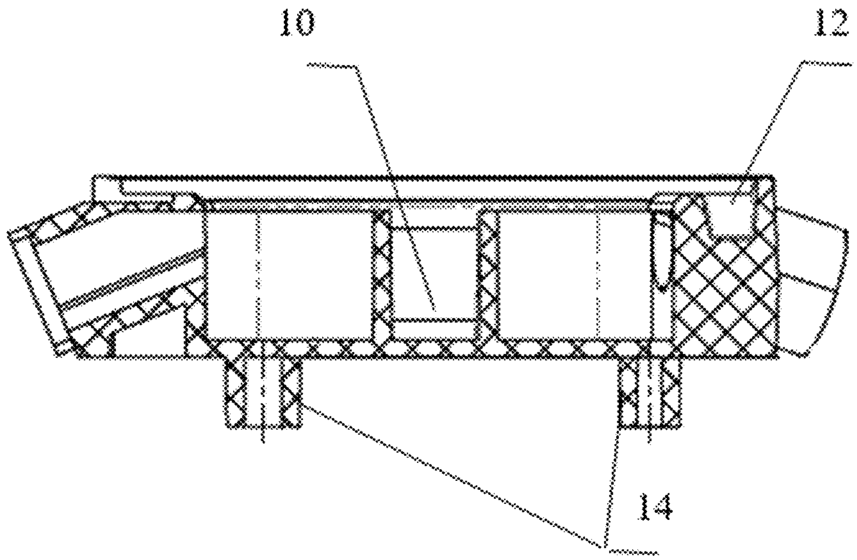
FIG. 4 shows a cross-sectional side view of the housing base.
Figure 5:
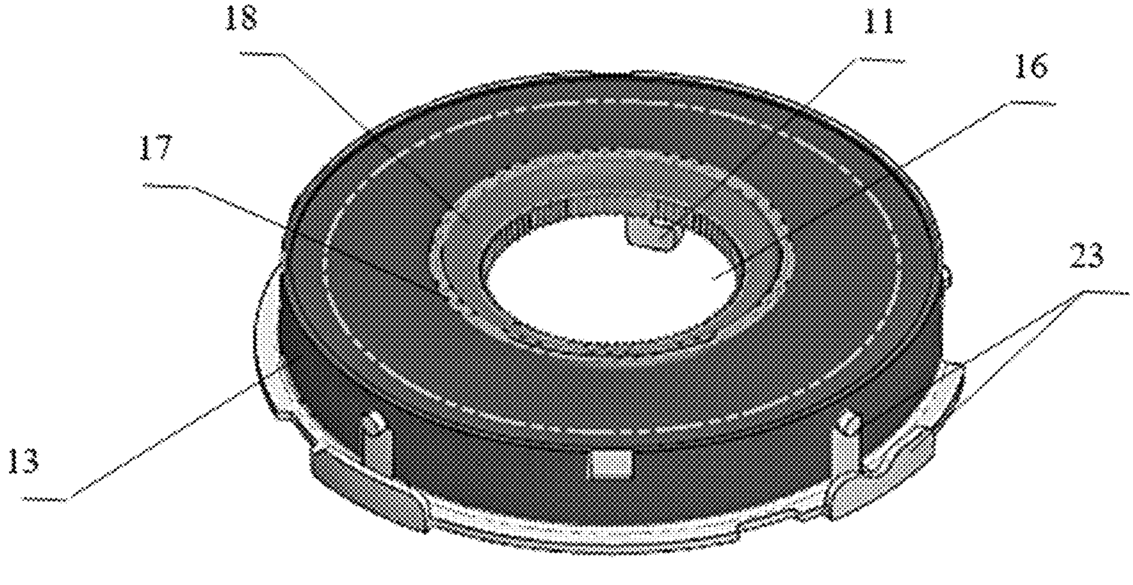
FIG. 5 shows an axonometric perspective view of the housing casing.
Figure 6:
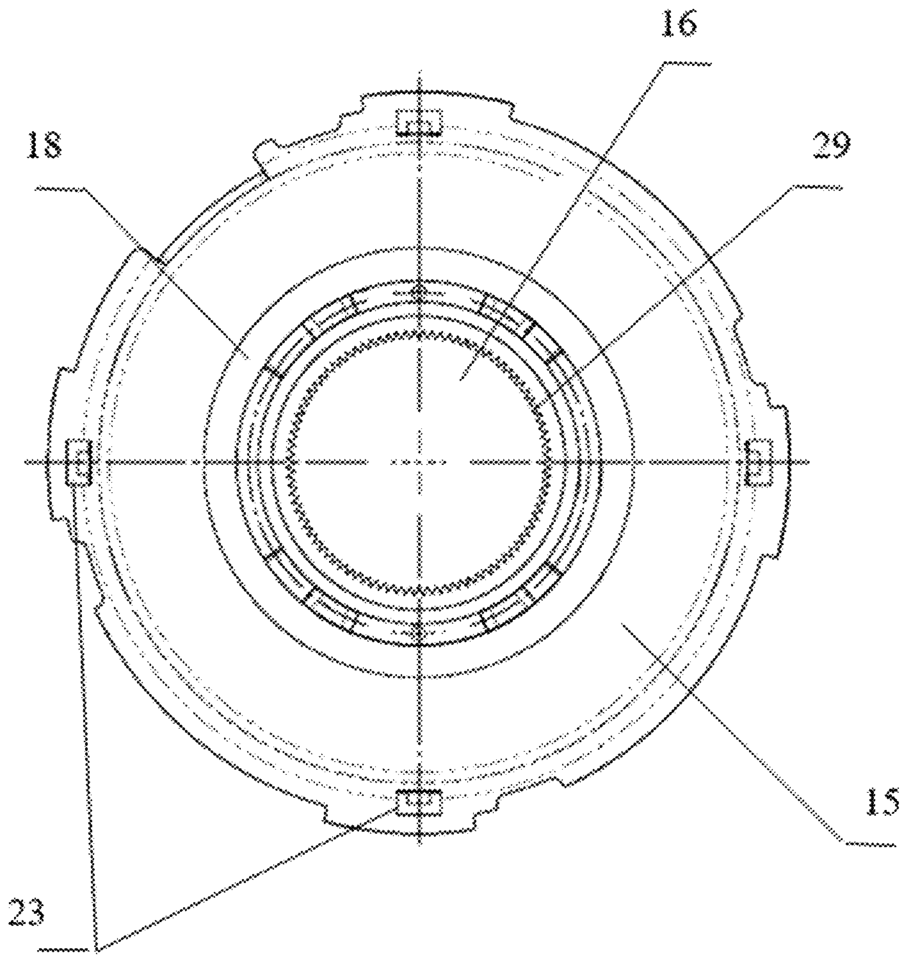
FIG. 6 shows a top view of the housing casing.
Figure 7:
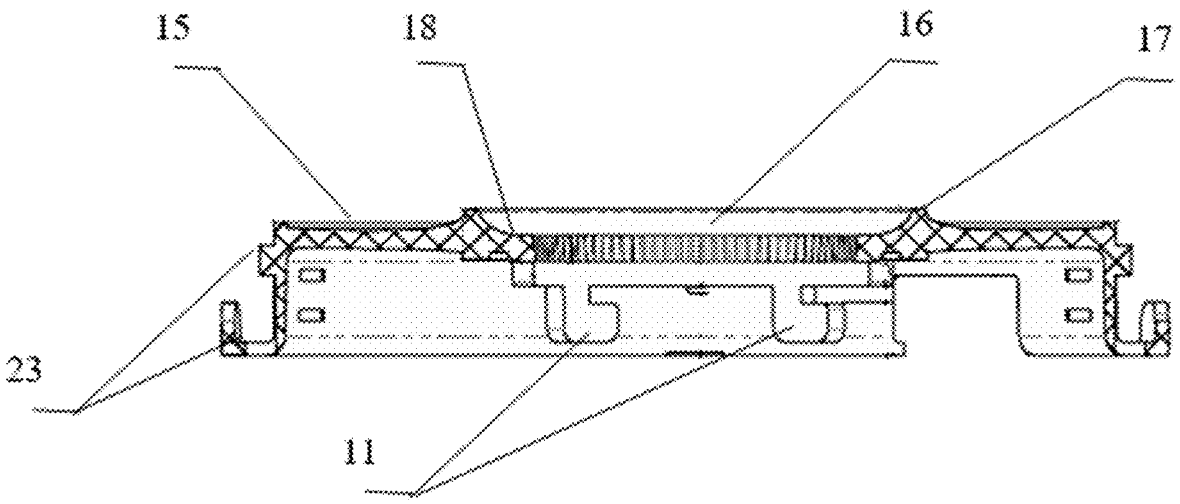
FIG. 7 shows a cross-sectional side view of the housing casing.
Figure 8:
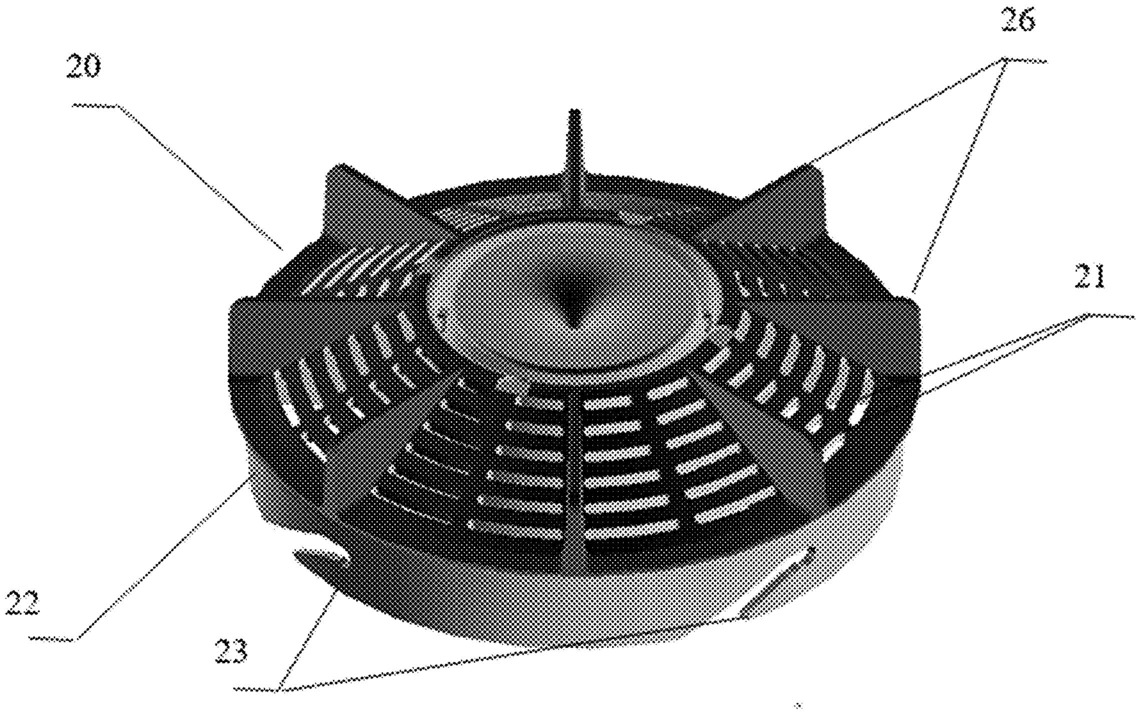
FIG. 8 shows an axonometric perspective view of the cover element of the housing from outside.
Figure 9:
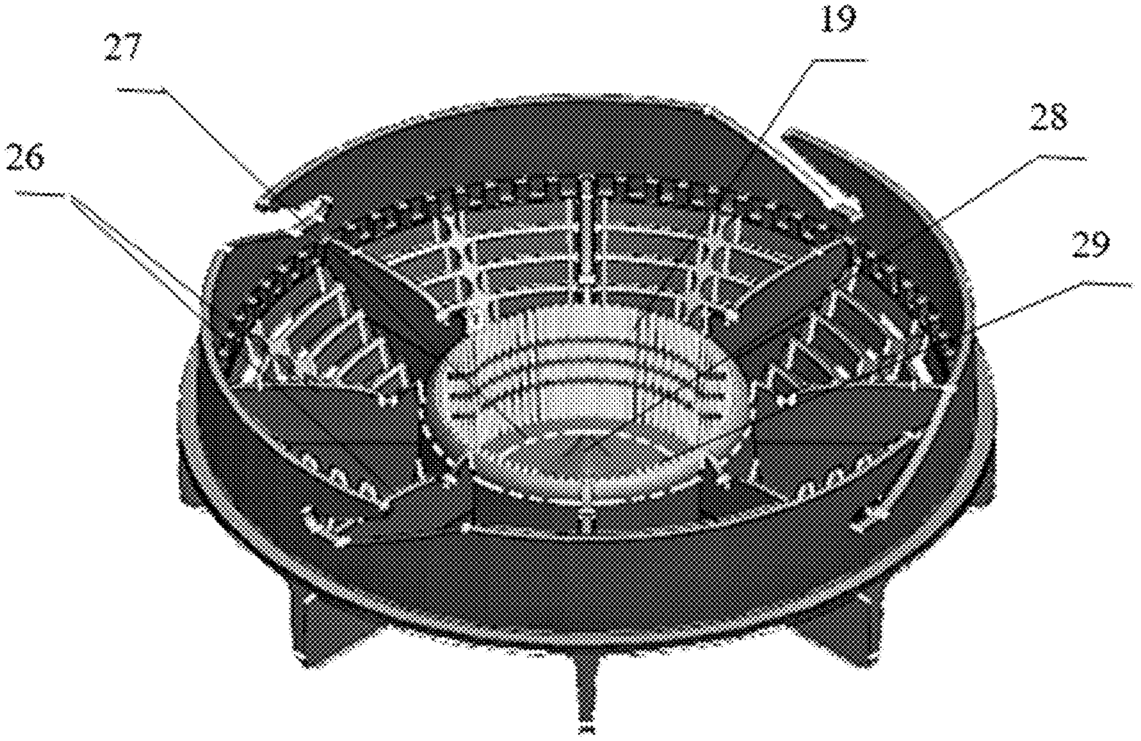
FIG. 9 shows an axonometric perspective view of the cover element of the housing from inside.
Figure 10:
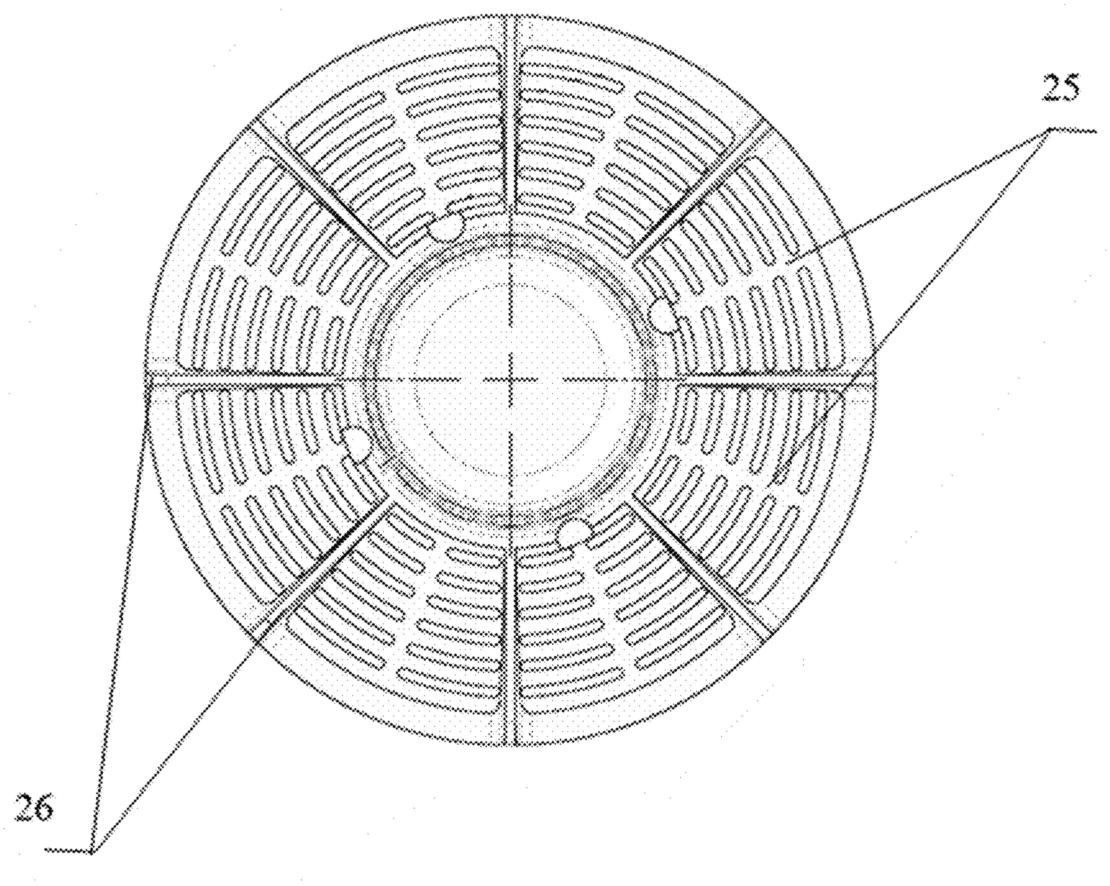
FIG. 10 shows a top view of the cover element.
Figure 11:
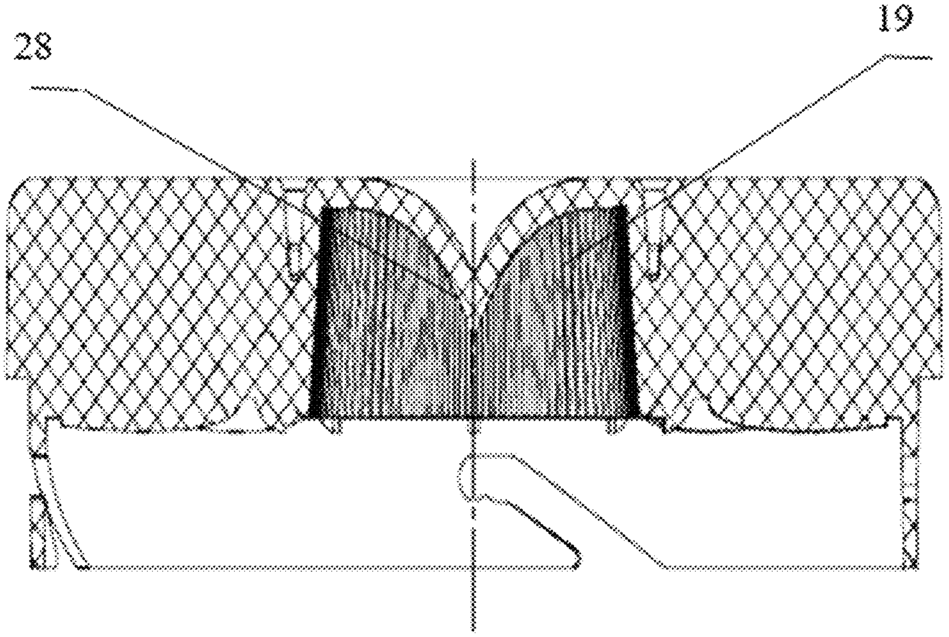
FIG. 11 shows a cross-sectional side view of the cover element.
Figure 12:
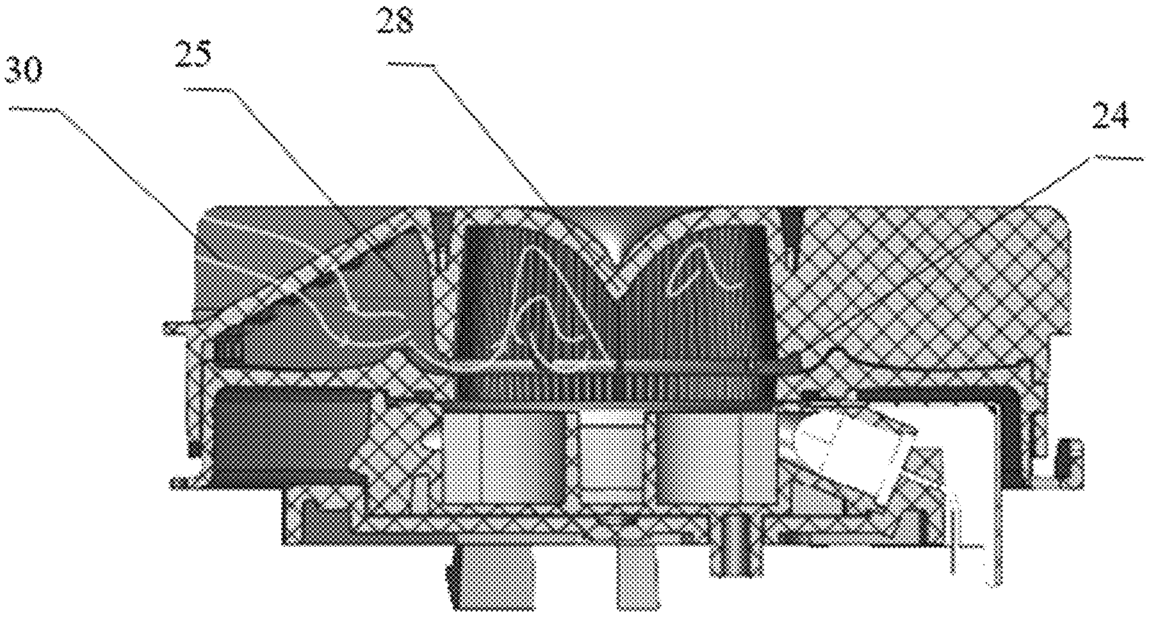
FIG. 12 shows a longitudinal section of the assembled housing, while indicating the flow pass of the air-gas mixture.

MAIN DESIGNATIONS 1. mounting plate,
2. base,
3. casing,
4. cover element,
5. fastening elements for the mounting plate,
6. lateral wall of the base,
7. inner opaque wall of the base,
8. guiding channels of the optical elements,
9. limiting barriers of the optical elements,
10. inner end surface of the base,
11. fixation elements for fixing the casing to the base,
12. fixation elements for fixing the base to the casing,
13. lateral portion of the casing,
14. fastening elements for fastening the base to the mounting plate,
15. disc portion of the casing,
16. central opening of the disc portion of the casing,
17. annular protrusion,
18. tilted area of the disc portion of the casing,
19. central portion of the cover element,
20. peripheral portion of the cover element,
21. openings of the peripheral portion,
22. lateral portion of the cover element,
23. interlocking elements of the cover element and the casing,
24. annular slit,
25. sectors,
26. radial partitions,
27. inner end surface of the cover element,
28. cone-like protrusion,
29. light-scattering ribs,
30. path of the air-gas flow.

Implementation of the Invention

A housing for a scattered light detection unit of a smoke detection device comprises a mounting plate (1), a base (2) fastened thereon, where a casing (3) is mounted on the base, and a cover element (4) is mounted on top of the casing, and the mounting plate (1) has fixation elements (5) for fixing to a printed circuit board having electronic elements of the smoke detection device (not shown in the drawings). The base has a lateral wall (6) and an inner wall (7) that is concentric to the lateral wall (6). Channels (8) are made through the lateral wall (6) and the inner wall (7) of the base (2) in order to insert optical elements inside the inner wall (7) so as they are arranged one opposite to another and directed at a certain angle to a horizontal plane. Sites, where the channels (8) enter, are surrounded by limiting curved elements (9)—barriers, which are vertically arranged relative to an inner end surface (10), while forming a gap between them. Therewith, a height of the barriers (9) is almost the same as, but not more than a height of the wall (7). Such a configuration provides an opaqueness of a space formed by the inner wall (7) and an inner end surface (10), avoids an intersection of a direct light coming from light-emitting optical elements with a vision field of a light-receiving optical element, and provides a free space formed between the inner surface (10), the limiting elements (9) and the wall (7) which forms a recess for dust sedimentation.

The casing (3) is mounted on the base (2), and the casing is equipped with fixation elements (11) for interacting with corresponding elements (12) which are provided in a gap between the lateral wall (6) and the inner wall (7) of the base (2) and are capable of detachable fixation, and its lateral portion (13) encompasses the mounting plate (1) with the base (2) fastened thereon by means of elements (14). The casing (3) has a disc portion (15) that is parallel to the base (2) and provided with an opening (16) that is coaxial to the opaque inner wall (7). An annular protrusion (17) is provided on an outer surface of the disc portion (15) of the casing (3), and a curved tilted area (18) is provided from the protrusion to an edge of the opening (16), thereby making the edge of the opening (16) directed towards the base (2). Therewith, a diameter of the opening (16) is the same as a diameter of the wall (7), and when the casing (3) is fixed on the base (2), these elements form a tight fit.

The cover element (4) consists of a central portion (19) that is closed from one end and faces towards the casing (3) with its open end, and a diameter of the open end is the same as the diameter of the opening (16) of the casing (3), a peripheral lattice portion (20) having series of longitudinal slit-like openings (21) arranged concentrically, and a lateral portion (22). The lateral portion (22) of the cover element (4) is fixable on the lateral portion (13) of the casing (3), and they are equipped with interlocking elements (23) for this. Therewith, in a fixed state, a gap is formed between the open end of the central portion (19) of the cover element (4) and the curved tilted area (18) of the disc portion (15) of the casing (3), thereby providing an annular slit (24) formed between the opening (16) and the open end of the central portion (19). The peripheral lattice portion (20) of the cover element is divided into sectors (25) by radial equidistant partitions (26). Therewith, when the cover element (4) and the casing (3) are locked, lower portions of the partitions (26) tightly fit to the disc portion (15) of the casing (3).

A cone-like protrusion (28) is provided on the inner end surface (27) of the central portion (19) by providing an end surface with a smooth transition from edges to a center, the protrusion is directed towards the open end of the central portion (19), and a height of the cone-like protrusion (28) is approximately the same as, but not more than a half length of the central portion (19).

Such a configuration of the housing provides a smoke chamber formed within the housing, the chamber consists of a first part that is limited by the inner wall (7) of the base (2), the lower inner end surface (10) of the base (2) and the edge of the opening (16) of the casing (3), and a second part that is formed by the central portion (19) of the cover element (4). Therewith, the air-gas mixture comes into the smoke chamber through the annular slit (24) along a surface of the tilted area (18) to which it incomes through the openings (21) of the peripheral lattice portion (20) along the sectors (25) between the radial partitions (26), while a contact between the radial partitions and the disc surface is limited by the annular protrusion (17). Owing to the provision of the cone-like protrusion (28) in the center of the second part of the smoke chamber and its smooth curvature from the walls to the center, instable smoke flows will be captured, if they are present in the air-gas mixture, “flowed down” and concentrated in the gap between the central portion (19) and the opening (16).

In order to provide an optimal path (30) for the air-gas flow, a number of the radial partitions (26) of the peripheral portion (20) of the cover element (4) is from 6 to 8, thereby forming a corresponding number of sectors (26) along which the air-gas mixture that gets through the openings (21) is guided towards the annular slit (24) and passes into the smoke chamber. Therewith, a ratio between an area of the openings (21) to an overall area of the peripheral portion (20) of the element must be within 30-40%, thereby enabling proper filtration, homogeneous passage and guiding the air-gas flow to the smoke chamber. Such a configuration enables to divide and to simultaneously extend the incoming paths of the air-gas mixture from the entire surface of the peripheral portion of the cover element, thereby facilitating sedimentation of foreign dust impurities on these paths, enhancing the guiding homogeneity and increasing the flow density of the air-gas mixture when passing through the annular slit. A width of the slit is from 0.5 to 0.8 mm, thereby enabling concentration of the flow inside the smoke chamber in the slit area at any dimensions of the housing, i.e., it facilitates concentration of the smoke in a zone that defines "an optical center" of the detection.

Therewith, light-scattering elements may be further provided on the inner surface of the central portion (19) of the cover element (4) and on the surface of the edge of the opening (16) of the casing (3), the light-scattering elements are formed as coaxial vertical ribs (29) which further promote re-scattering and blocking of the direct emission inside the smoke chamber, since a photoreceiver, in a normal state, should not receive a signal from emitters. Surfaces which are tangent to the incoming paths of the air-gas mixture may be made glossy (polished), in particular, the disc surface (15) of the casing (3) and the outer surface of the cover element (4), as well as the inner surface of the first part of the smoke chamber, in particular, the inner wall of the base (7), the inner end surface (10) and the barrier elements (9) in installation sites of the optical elements, thereby promoting the passage of the air-gas mixture inside the smoke chamber and screening out possible solid particles which are present in the upward flow of the air-gas mixture. And the inner surface of the central portion (19) of the cover element (4), the curved tilted area (18) and the edge of the opening (16) of the casing may have a SPI-SPE-D1 grade texturing. All elements of the housing are made of a fireproof black plastic, e.g., of AF312A brand, by injection molding. In order to provide texturing of the surface, press molds must be prepared for treatment according to the standards of the Society of the Plastics Industry (SPI), and produced elements of the housing may be subjected to final processing in order to avoid any defects on said surfaces.

Such a texture of the surfaces facilitates concentration of the smoke inside the air space of the second part of the smoke chamber and in the area, where the slit (24) is formed. The optical elements of the scattered light detector must be directed in this particular zone during installing into the channels (8) with the limiting curved elements (9).

Therewith, light-emitting elements of two different wavelengths may be used as the optical elements, and the light-emitting elements differently react to different particles present in the flow of the air-gas mixture, e.g., smoke or vapor, and the photoreceiver that is activated when the light reflected particularly from the smoke particles gets into the vision field thereof.

Preferably, components of the housing are made cylindrical, while the mutual fixation tools provided between them enables a convenient servicing and easy replacement of the components if needed. At the same time, many different modifications of both the housing shape and the fixation tools are possible, and they may be easily made by skilled persons without deviating from the essence of the invention.

Therefore, the claimed invention enables to provide the housing of the scattered light detection unit with forming the opaque smoke chamber and the smoke detection zone with paths for incoming and concentration of the gas-air mixture provided thereto, while providing the maximum cleanliness of the interior of the housing and optical elements of the detection unit arranged therein from any external contaminations, thereby allowing to use the claimed housing effectively in the smoke detection devices.

The invention claimed is:

1. A housing for a scattered light detection unit of a smoke detection device, the housing comprising a base (2) fastened to a mounting plate (1), the base comprising guiding channels (8) for mounting and directing optical elements; limiting barriers (9) attached to the channels (8), the limiting barriers arranged on an inner end surface (10) of the base (2) and surrounded by an opaque wall (7) that is concentric to a lateral outer wall (6); a casing (3) mounted on the base (2), the casing having a lateral portion (13) that encompasses the base (2), the mounting plate (1), and a disc portion (15) that is parallel to the base (2), the disc portion comprising an opening (16) having an edge that is directed towards the base (2) and that is coaxial to the opaque wall (7); and a cover element (4) fastened on the casing (3), wherein the casing (3) is fixable on the base (2), thereby fitting the edge of the opening (16) to an edge of the opaque wall (7), wherein the limiting barriers (9) are vertically arranged relative to the inner end surface (10) and opposite to each other, while forming a gap between them, wherein a height of the barriers (9) is not more than a height of the opaque wall (7), wherein the edge of the opening (16) of the casing (3) is directed by an annular protrusion (17) provided on an outer surface of the disc portion (15), the annular protrusion being connected to the edge of the opening (16) by a curved tilted area (18), wherein the cover element (4) comprises a central portion (19) that is closed at one end and faced towards the casing (3) with an open end, a peripheral portion (20) having series of concentrically arranged longitudinal slit-like openings (21), and a lateral portion (22) that is fixable on the lateral portion (13) of the casing (3), wherein an inner end surface of the central portion (19) is curved, while forming a smooth transition to a cone-like protrusion (28) from its edge to its center, and a height of the cone-like protrusion (28) is not more than a length of the central portion (19), wherein a diameter of the open end of the central portion (19) is the same as a diameter of the opening (16), wherein the peripheral portion (20) of the cover element (4) is divided into sectors by equidistant radial partitions (26), and wherein the lateral portion (22) of the cover element (4) is fixable on the lateral portion (13) of the casing (3), with an annular slit (24) formed between the open end of the central portion (19) and a curved tilted area (18) of the disc portion (15) of the casing (3), and lower portions of the radial partitions (26) of the peripheral portion (20) fit to the disc portion (15) of the casing (3).

2. The housing for the detection unit according to claim 1, wherein the disc surface (15), the outer surface of the cover element (4), the opaque wall (7), the inner end surface (10) and the barrier elements (9) are polished, while an inner surface of the central portion (19), the curved tilted area (18) and the edge of the opening (16) have a SPI-SPE-D1 grade texturing.

3. The housing for the detection unit according to claim 1, wherein coaxial scattering elements formed as vertical ribs (29) are provided on a surface of the edge of the opening (16) and on the inner surface of the central portion (19).

4. The housing for the detection unit according to claim 1, wherein a number of the radial partitions (26) is from 6 to 8.

5. The housing for the detection unit according to claim 1, wherein a cross-sectional area of the openings (21) is 30-40% of a general surface area of the peripheral portion (20).

6. The housing for the detection unit according to claim 2, wherein coaxial scattering elements formed as vertical ribs (29) are provided on a surface of the edge of the opening (16) and on the inner surface of the central portion (19).

7. The housing for the detection unit according to claim 2, wherein a number of the radial partitions (26) is from 6 to 8.

8. The housing for the detection unit according to claim 3, wherein a number of the radial partitions (26) is from 6 to 8.

9. The housing for the detection unit according to claim 6, wherein a number of the radial partitions (26) is from 6 to 8.

10. The housing for the detection unit according to claim 2, wherein a cross-sectional area of the openings (21) is 30-40% of a general surface area of the peripheral portion (20).

11. The housing for the detection unit according to claim 3, wherein a cross-sectional area of the openings (21) is 30-40% of a general surface area of the peripheral portion (20).

12. The housing for the detection unit according to claim 6, wherein a cross-sectional area of the openings (21) is 30-40% of a general surface area of the peripheral portion (20).

13. The housing for the detection unit according to claim 4, wherein a cross-sectional area of the openings (21) is 30-40% of a general surface area of the peripheral portion (20).

14. The housing for the detection unit according to claim 7, wherein a cross-sectional area of the openings (21) is 30-40% of a general surface area of the peripheral portion (20).

15. The housing for the detection unit according to claim 8, wherein a cross-sectional area of the openings (21) is 30-40% of a general surface area of the peripheral portion (20).

16. The housing for the detection unit according to claim 9, wherein a cross-sectional area of the openings (21) is 30-40% of a general surface area of the peripheral portion (20).

17. The housing for the detection unit according to claim 1, wherein the height of the cone-like protrusion (28) is not more than a half length of the central portion (19).

* * * * *